United States Patent [19]

Dawes et al.

[11] 3,862,124
[45] Jan. 21, 1975

[54] TRIAZOLYLTHIOPHOSPHORIC ACID ESTERS

[75] Inventors: Dag Dawes, Pratteln; Beat Boehner, Binningen, both of Switzerland

[73] Assignee: Ciba-Giegy Corporation, Ardsley, N.Y.

[22] Filed: Oct. 19, 1971

[21] Appl. No.: 190,695

[30] Foreign Application Priority Data
Oct. 22, 1970  Switzerland...................... 15608/70
Sept. 15, 1971  Switzerland...................... 13471/71

[52] U.S. Cl................. 260/308 R, 424/200, 71/87
[51] Int. Cl............................................ C07d 55/06
[58] Field of Search ............................... 260/308 R

[56] References Cited
UNITED STATES PATENTS

| | | | |
|---|---|---|---|
| 3,216,894 | 11/1965 | Lorenz et al.................. | 260/308 X |
| 3,686,200 | 8/1972 | Scherer et al.................. | 260/308 R |
| 3,689,500 | 9/1972 | Bohner et al. ................. | 260/308 R |

FOREIGN PATENTS OR APPLICATIONS

| | | | |
|---|---|---|---|
| 1,549,674 | 11/1968 | France.......................... | 260/308 R |
| 713,278 | 8/1954 | Great Britain ................. | 260/308 R |

*Primary Examiner*—Joseph A. Narcavage
*Attorney, Agent, or Firm*—Harry Falber; Frederick H. Rabin

[57] ABSTRACT

Compounds of the formula

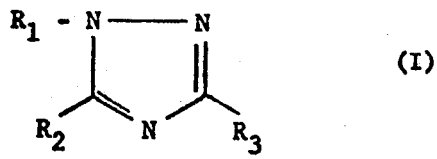

(I)

wherein
  $R_1$ represents a lower alkyl radical, a cycloalkyl radical, or a phenyl radical optionally substituted by chlorine and/or bromine,
of the symbols
  $R_2$ and $R_3$ any one represents hydrogen, a lower alkyl radical, a cycloalkyl radical, a phenyl radical optionally substituted by chlorine, and the other then represents the radical:

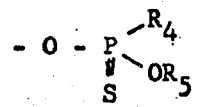

wherein $R_4$ represents a lower alkyl radical or the phenyl radical, and $R_5$ a lower alkyl radical, their manufacture and their use for the control of diverse pests of the vegetable or animal kingdom.

15 Claims, No Drawings

TRIAZOLYLTHIOPHOSPHORIC ACID ESTERS

The present invention relates to new triazolylthiophosphonic acid esters, to processes for their production, and to the use thereof for pest control.

The new triazolylthiophosphonic acid esters correspond to the formula:

$$R_1-N\underset{\underset{N}{\parallel}}{\overset{\phantom{X}}{\diagdown}}\hspace{-1em}\underset{R_2}{\diagup}\hspace{-1em}\underset{\phantom{X}}{\overset{N}{\diagdown}}\hspace{-1em}\underset{R_3}{\diagup} \quad (I)$$

wherein
  $R_1$ represents a lower alkyl radical, a cycloalkyl radical, or a phenyl radical optionally substituted by chlorine and/or bromine, of the symbols
  $R_2$ and $R_3$ any one represents hydrogen, a lower alkyl radical, a cycloalkyl radical, a phenyl radical optionally substituted by chlorine, and the other the radical $$-O-\underset{\underset{S}{\parallel}}{P}\underset{OR_5}{\overset{R_4}{\diagup}}$$

wherein $R_4$ represents a lower alkyl radical or the phenyl radical, and $R_5$ a lower alkyl radical.

By a lower alkyl radical is meant in each case a straight-chain or branched radical having 1 to 5 carbon atoms, e.g. methyl, ethyl, n-propyl, isopropyl, n-butyl and n-pentyl, as well as isomers thereof. Preferred as cycloalkyl radicals are the cyclopentyl and cyclohexyl radical.

Preferred compounds because of their effect are compounds of formula I wherein $R_1$ represents $C_1-C_6$-alkyl, a $(X)_n\!-\!C_6H_{5-n}$ radical wherein X is chlorine or bromine and $n$ is a number from 0 to 2, such as phenyl, 3-chlorophenyl, 4-chlorophenyl, 4-bromophenyl or 2,5-dichlorophenyl; $R_2$ represents hydrogen, phenyl, $C_1-C_4$-alkyl or $$-O-\underset{\underset{S}{\parallel}}{P}\underset{C_2H_5}{\overset{OC_2H_5}{\diagup}};$$

$R_3$ represents phenyl or $$-O-\underset{\underset{S}{\parallel}}{P}\underset{OR_5}{\overset{R_4}{\diagup}};$$

$R_4$ represents methyl, ethyl or phenyl; and $R_5$ represents $C_1-C_5$-alkyl.

The new triazolylthiophosphonic acid esters of formula I are produced according to the invention by
  a. the reaction of a hydroxytriazole of formula II:

$$R_1-N\underset{\underset{N}{\parallel}}{\overset{\phantom{X}}{\diagdown}}\hspace{-1em}\underset{X}{\diagup}\hspace{-1em}\underset{\phantom{X}}{\overset{N}{\diagdown}}\hspace{-1em}\underset{Y}{\diagup} \quad (II)$$

in which one of the symbols
  X and Y represents hydrogen, a lower alkyl radical, a cycloalkyl radical, or a phenyl radical optionally substituted by chlorine; and the other the hydroxyl group, and
  $R_1$ has the meanings given under formula I, with a thiophosphonic acid halide of formula III:

$$Hal-\underset{\underset{\phantom{X}}{\parallel}}{\overset{S}{P}}\underset{OR_5}{\overset{R_4}{\diagup}} \quad (III)$$

wherein Hal represents chlorine or bromine, and $R_4$ and $R_5$ have the meanings given under formula I, in the presence of an acid-binding agent; or
  b. the reaction of a metal salt of a hydroxytriazole of formula II with a thiophosphonic acid halide of formula III.

Salts of hydroxytriazoles of formula II which are suitable for the process according to the invention are, in particular, the alkali metal salts; there are, however, other suitable salts, e.g. salts of monovalent heavy metals.

Suitable as acid-binding agents are, e.g. the following bases: tertiary amines such as triethylamine, dimethylaniline, pyridine, pyridine bases, inorganic bases such as hydroxides and carbonates of alkali metals and alkaline-earth metals, preferably sodium and potassium carbonate.

The reactions can be preferably carried out in solvents or diluents inert to the reactants. The following are, for example, suitable for this prupose: aromatic hydrocarbons such as benzene, toluene, benzines, halogenated hydrocarbons, chlorobenzene, polychlorobenzenes, bromobenzene, chlorinated alkanes having 1 to 3 carbon atoms, ethers such as dioxane, tetrahydrofuran; esters such as ethyl acetate; ketones such as methyl ethyl ketone, diethyl ketone, nitriles, etc.

The starting materials of formula II are in some cases known compounds which can be produced by processes known per se. These compounds are obtained, for example, by the reaction of a correspondingly substituted semicarbazide with orthocarboxylic acid ethyl ester, e.g. orthoformic acid ethyl ester; or by the acylation firstly of a correspondingly substituted semicarbazide, and subsequent ring closure under alkaline conditions (cp. e.g. J.B. Chem. Ber. 56, 1797).

The active substances of formula I are suitable for the control of the most diverse pests of the vegetable or animal kingdom.

They are effective, in particular, against all development stages such as, e.g. eggs, larvae and pupae of insects and members of the order acarina, such as mites and ticks.

The compounds of formula I can be used, for example, to combat the following insects or members of the order acarina:
Insects of the families:
  Teltigonidae
  Gryllidae
  Gryllotalpidae
  Blattidae
  Peduviidae
  Phyrrhocoriae
  Cimicidae
  Delphacidae
  Alphididae
  Diaspididae Pseudococcidae
Scarabaeidae
Dermestidae
Coccinellidae
Tenebrionidae
Chrysomelidae
Bruchidae
Tineidae
Noctindae
Lymatriidae
Pyralidae
Culicidae
Tipulidae
Stomoxydae
Trypetidae
Muscidae
Calliphoridae and
Pulicidae Acarida of the families:
Ixodidae
Argasidae
Tetranychidae and
Dermanyssidae.

The insecticidal or acaricidal action can be substantially broadened and adapted to suit the given circumstances by the addition of other insecticides and/or acaricides. Suitable additives are, amongst others, e.g. the following active substances:

Bis-O,O-diethylphosphoric acid anhydride (TEPP)
Dimethyl-(2,2,2-trichloro-1-hydroxyethyl)-phosphonate (TRICHLORFON)
1,2-dibromo-2,2-dichloroethyldimethylphosphate (NALED)
2,2-dichlorovinyldimethylphosphate (DICHLORVOS)
2-methoxycarbamyl-1-methylvinyldimethylphosphate (MEVINPHOS)
Dimethyl-1-methyl-2-(methylcarbamoyl)-vinylphosphate cis (MONOCROTOPHOS)
3-(dimethoxyphosphinyloxy)-N,N-dimethyl-cis-crotonamide (DICROTOPHOS)
2-chloro-2-diethylcarbamoyl-1-methylvinyldimethylphosphate (PHOSPHAMIDON)
O,O-diethyl-O(or S)-2-(ethylthio)-ethylthiophosphate (DEMETON)
S-ethylthioethyl-O,O-dimethyl-dithiophosphate (THIOMETON)
O,O-diethyl-S-ethylmercaptomethyldithiophosphate (PHORATE)
O,O-diethyl-S-2-ethylthio)ethyldithiophosphate (DISULFOTON)
O,O-dimethyl-S-2-(ethylsulphinyl)ethylthiophosphate (OXYDEMETONMETHYL)
O,O-dimethyl-S-(1,2-dicarbethoxyethyldithiophosphate (MALATHION)
O,O,O,O-tetraethyl-S,-S'-methylene-bis-dithiophosphate (ETHION)
O-ethyl-S,S-dipropyldithiophosphate
O,O-dimethyl-S-(N-methyl-N-formylcarbamoylmethyl)-dithiophosphate (FORMOTHION)
O,O-dimethyl-S-(N-methylcarbamoylmethyl)dithiophosphate (DIMETHOATE)
O,O-dimethyl-O-p-nitrophenylthiophosphate (PARATHION-METHYL)
O,O-diethyl-O-p-nitrophenylthiophosphate (PARATHION)
O-ethyl-O-p-nitrophenylphenylthiophosphate (EPN)
O,O-dimethyl-O-(4-nitro-m-tolyl)thiophosphate (FENITROTHION)
O,O-dimethyl-O-2,4-5-trichlorphenylthiophosphate (RONNEL)
O-ethyl-0,2,4,5-trichlorphenylethylthiophosphate (TRICHLORONATE)
O,O-dimethyl-O-2,5-dichlor-4-bromphenylthiophosphate (BROMOPHOS)
O,O-dimethyl-O-(2,5-dichlor-4-jodphenyl)-thiophosphate (JODOFENPHOS)
4-tert. butyl-2-chlorphenyl-N-methyl-O-methylamidophosphate (CRUFOMATE)
O,O-dimethyl-O-(3-methyl-4-methylmercaptophenyl)thiophosphate (FENTHION)
Isopropylamino-O-ethyl-O-(4-methylmercapto-3-methylphenyl)phosphate
O,O-diethyl-O-p-(methylsulphinyl)phenyl-thiophosphate (FENSULFOTHION)
O-p-(dimethylsulfamido)phenyl O,O-dimethylthiophosphate (FAMPHUR)
O,O,O',O'-tetramethyl-O,O'-thiodi-p-phenylenthiophosphate
O-ethyl-S-phenyl-ethyldithiophosphate
O,O-dimethyl-O-(α-methylbenzyl-3-hydroxycrotonyl)phosphate
2-chlor-1-(2,4-dichlorphenyl)vinyl-diethylphosphate (CHLORFENVINPHOS)
2-chlor-1-(2,4,5-trichlorphenyl)vinyl-dimethylphosphate
O-[2-chlor-1-(2,5-dichlorphenyl)]vinyl-O,O-diethyl-thiophosphate
Phenylglyoxylonitriloxim-O,O-diethylthiophosphate (PHOXIM)
O,O-diethyl-O-(3-chlor-4-methyl-2-oxo-2-H-1-benzopyran-7-yl)-thiophosphate (COUMAPHOS)
2,3-p-dioxandithiol-S,S-bis(O,O-diethyldithiophosphate (DIOXATHION)
5-[(6-chlor-2-oxo-3-benzoxazolinyl)methyl]O,O-diethyldithiophosphate (PHOSALONE)
2-(diethoxyphosphinylimino)-1,3-dithiolane
O,O-dimethyl-S-[2-methoxy-1,3,4-thiadiazol-5-(4H)-onyl-(4)-methyl]dithiophosphate
O,O-dimethyl-S-phthalimidomethyl-dithiophosphate (IMIDAN)
O,O-diethyl-O-(3,5,6-trichlor-2-pyridyl)thiophosphate
O,O-diethyl-O-2-pyrazinylthiophosphate (THIONAZIN)
O,O-diethyl-O-(2-isopropyl-4-methyl-6-pyrimidyl)-thiophosphate (DIAZINON)
O,O-diethyl-O-(2-chinoxalyl)thiophosphate
O,O-dimethyl-S-(4-oxo-1,2,3-benzotriazin-3(4H)-ylmethyl)-dithiophosphate (AZINPHOSMETHYL)
O,O-diethyl-S-(4-oxo-1,2,3-benzotriazin-3(4H)-ylmethyl)-dithiophosphate (AZINPHOSETHYL)
S-[(4,6-diamino-s-triazin-2-yl)methyl]-O,O-dimethyldithiophosphate (MENAZON)
O,O-dimethyl-O-(3-chlor-4-nitrophenyl)thiophosphate (CHLORTHION)
O,O-dimethyl-O(or S)-2-(ethylthioethyl)thiophosphate (DEMETON-S-METHYL)
2-(O,O-dimethyl-phosphoryl-thiomethyl)-5-methoxy-pyron-4-3,4-dichlorbenzyl-triphenylphosphoniumchloride O,O-diethyl-S-(2,5-dichlorphenylthiomethyl)dithiophosphate (PHENKAPTON)
O,O-diethyl-O-(4-methyl-cumarinyl-7-)-thiophosphate (POTASASN)
5-amino-bis(dimethylamido)phosphinyl-3-phenyl-(POTASAN)-triazole (TRIAMIPHOS)
N-methyl-5-(O,O-dimethylthiolphosphoryl)-3-thiavaleramide (VAMIDOTHION)
O,O-diethyl-O-[2-dimethylamino-4-methylpyrimidyl-(6)]-thiophosphate (DIOCTHYL)
O,O-dimethyl-S-(methylcarbamoylmethyl)-thiophosphate (OMETHOATE)
O-ethyl-O-(8-quionolinyl)-phenylthiophosphonate (OXINOTHIOPHOS)
O-methyl-S-methyl-amidothiophosphate (MONITOR)
O-methyl-O-(2,5-dichlor-4-bromphenyl)-benzothiophosphate (PHOSVEL)
O,O,O,O-tetrapropyldithiophosphate
3-(dimethoxyphosphinyloxy)-N-methyl-N-methoxy-cis-crotonamide
O,O-dimethyl-S-(N-ethylcarbamoylmethyl)dithiophosphate (ETHOATE-METHYL)
O,O-diethyl-S-(N-isopropylcarbamoylmethyl)-dithiophosphate (PROTHOATE)
S-N-(1-cyano-1-methylethyl)carbamoylmethyldiethylthiolphosphate (CYANTHOATE)
S-(2-acetamidoethyl)-O,O-dimethyldithiophosphate
Hexamethylphosphoric acid triamide (HEMPA)
O,O-dimethyl-O-(2-chlor-4-nitrophenyl)thiophosphate (DICAPTHON)
O,O-dimethyl-O-p-cyanophenyl thiophosphate (CYANOX)
O-ethyl-O-p-cyanophenylthiophosphonate
O,O-diethyl-0-2,4-dichlorphenylthiophosphate (DICHLORFENTHION)
0,2,4-dichlorphenyl-O-methylisopropylamidothiophosphate
O,O-diethyl-O-2,5-dichlor-4-bromphenylthiophosphate (BROMOPHOS-ETHYL)
Dimethyl-p-(methylthio)phenylphosphate
O,O-dimethyl-O-p-sulfamidophenylthiophosphate
O-[p-(p-chlorphenyl)azophenyl]O,O-dimethylthiophosphate (AZOTHOATE)
O-ethyl-S-4-chlorphenyl-ethyldithiophosphate
O-isobutyl-S-p-chlorphenyl-ethyldithiophosphate
O,O-dimethyl-S-p-chlorphenylthiophosphate
O,O-dimethyl-S-(p-chlorphenylthiomethyl)dithiophosphate
O,O-diethyl-p-chlorphenylmercaptomethyl-dithiophosphate (CARBOPHENOTHION)
O,O-diethyl-S-p-chlorphenylthiomethyl-thiophosphate
O,O-dimethyl-S-(carbethoxy-phenylmethyl)dithiophosphate (PHENTHOATE)
O,O-diethyl-S-(carbofluorethoxy-phenylemthyl)-dithiophosphate
O,O-dimethyl-S-(carboisopropoxy-phenylmethyl)-dithiophosphate
O,O-diethyl-7-hydroxy-3,4-(tetramethylene-coumarinyl-thiophosphate (COUMITHOATE)
2-methoxy-4-H-1,3,2-benzodioxaphosphorin-2-sulphide.
O,O-diethyl-O-(5-pjenyl-3-isooxazolyl)thiophosphate
2-(diethoxyphosphinylimino)-4-methyl-1,3-dithiolane
Tris-(2-methyl-1-aziridinyl)-phosphine oxide (METEPA)
S-(2-chlor-1-phthalimidoethyl)-O,O-diethyldithiophosphate
N-hydroxynaphthalimido-diethylphosphate
Dimethyl-3,5,6-trichlor-2pyridylphosphate
O,O-dimethyl-O-(3,5,6-trichlor-2-pyridyl)thiophosphate
S-2-(ethylsulphonyl)ethyl dimethylthiolphosphate (DIOXYDEMETON-S-METHYL)
Diethyl-S-2-(ethylsulphinyl)ethyl dithiophosphate (OXYDISULFOTON)
Bis-O,O-diethylthiophosphoric acid anhydride (SULFOTEP)
Dimethyl-1,3-di(carbomethoxy)-1-propen-2-yl-phosphate
Dimethyl-(2,2,2-trichlor-1-butyroyloxyethyl)phosphate (BUTONATE)
O,O-dimethyl-O-(2,2-dichlor-1-methoxy-vinyl)phosphate
Bis-(dimethylamido)fluorphosphate (DIMEFOX)
3,4-dichlorbenzyl-triphenylphosphoniumchloride.
Dimethyl-N-methoxymethylcarbamoylmethyl-dithiophosphate (FORMOCARBAM)
O,O-diethyl-O-(2,2-dichlor-1-chlorethoxyvinyl)-phosphate
O,O-dimethyl-O-(2,2-dichlor-1-chlorethoxyvinyl)-phosphate
O-ethyl-S,S-diphenyldithiolphosphate
O-ethyl-S-benzyl-phenyldithiophosphonate
O,O-diethyl-S-benzyl-thiolphosphate
O,O-dimethyl-S-(4-chlorphenylthiomethyl)dithiophosphate (METHYLCARBOPHENOTHION)
O,O-dimethyl-S-(ethylthiomethyl)dithiophosphate
Diisopropylaminofluorphosphate (MIPAFOX)
O,O-dimethyl-S-(morpholinylcarbamoylmethyl)dithiophosphate (MORPHOTHION)
Bismethylamido-phenylphosphate
O,O-dimethyl-S-(benzene sulphonyl)dithiophosphate
O,O-dimethyl-(S and O)-ethylsulphinylethylthiophosphate
O,O-diethyl-O-4-nitrophenylphosphate
Triethoxy-isopropoxy-bis(thiophosphinyl)disulphide
2-methoxy-4H-1,3,2,benzodioxaphosphorin-2-oxide
Octamethylpyrophosphoramide (SCHRADAN)
Bis (dimethoxythiophosphinylsulphido)-phenylmethane
N,N,N',N'-tetramethyldiamidofluorphosphate (DIMEFOX)
O-phenyl-O-p-nitrophenyl-methanthiophosphonate (COLEP)
O-methyl-O-(2-chlor-4-tert. butyl-phenyl)-N-methylamidothiophosphate (NARLENE)
O-ethyl-O-(2,4-dichlorphenyl)-phenylthiophosphonate
O,O-diethyl-O-(4-methylmercapto-3,5-dimethylphenyl)-thiophosphate
4,4'-bis-(O,O-dimethylthiophosphoryloxy)-diphenyldisulphide
O,O-di-(β-chlorethyl)-O-(3-chlor-4-methyl-cumarinyl-7)-phosphate
S-(1-phthalimidoethyl)-O,O-diethyldithiophosphate
O,O-dimethyl-O-(3-chlor-4-diethylsulphamylphenyl)-thiophosphate O-methyl-O-(2-carbisopropoxyphenyl)-amidothiophosphate
5-(O,O-dimethylphosphoryl)-6-chlor-bicyclo(3.2.0)-heptadiene (1,5)
O-methyl-O-(2-i-propoxycarbonyl-1-methylvinyl)ethylamidothiophosphate
O-methyl-O-(2-chlor-4-tert. butyl-phenyl)-N-methylamidothiophosphate (NARLENE)
O-ethyl-O-(2,4-dichlorphenyl)-phenylthiophosphonate
O,O-diethyl-O-(4-methylmercapto-3,5-dimethylphenyl)-thiophosphate
4,4'-bis-(O,O-dimethylthiophosphoryloxy)-diphenyl disulphide,
O,O-di-(β-chlorethyl)-O-(3-chlor-4methyl-coumarinyl-7)-phosphate
S-(1-phthalimidoethyl)-O,O-diethyldithiophosphate
O,O-dimethyl-O-(3-chlor-4-diethylsulphamylphenyl)-thiophosphate
O-methyl-O-(2-carbisopropoxyphenyl)-amidothiophosphate
5-(O,O-dimethylphosphoryl)-6-chlor-bicyclo(3.2.0)-heptadiene (1,5)
O-methyl-O-(2-i-propoxycarbonyl-1-methylvinyl)-ethylamidothiophosphate.

Carbamic acid derivatives 1-naphthyl-N-methylcarbamate (CARBARYL)
2-butinyl-4-chlorophenylcarbamate
4-dimethylamino-3-tolyl-N-methylcarbamate (AMINOCARB)
4-methylthio-3,5-xylyl-N-methylcarbamate (METHIOCARB)
2-chlorophenyl-N-methylcarbamate (CPMC)
1- (dimethylcarbamoyl)-5-methyl-3-pyrazolyl-N,N-dimethylcarbamate (DIMETHILAN)
2,3-dihydro-2,2-dimethyl-7-benzofuranyl-N-methylcarbamate (CARBOFURAN)
2-methyl-2-methylthiopropional-O-(methylcarbamoyl)-oxime (ALDICARB)
8-quinaldyl-N-methylcarbamate and salts thereof
3-isopropyl-5-methylphenyl-N-methylcarbamate (PROMECARB)
2-(1,3-dioxolan-2yl)-phenyl-N-methylcarbamate (DIOXACARB)
2-(4,5-dimethyl-1,3-dioxalan-2-yl)-phenyl-N-methylcarbamate
2-(1,3-dithiolan-2-yl)-phenyl-N-methylcarbamate
2-(1,3-dithiolan-2-yl)-phenyl-N,N-dimethylcarbamate
2-isopropoxyphenyl-N-methylcarbamate (APROCARB)
4-diallylamino-3,5-xylyl-N-methylcarbamate (ALLYXICARB)
1-isopropyl-3-methylpyrazol-5-yl-N,N-dimethylcarbamate (ISOLAN)
1-methylthioethylimino-N-methylcarbamate (METHOMYL)
2-[propargylethylamino]-phenyl-N-methylcarbamate
2-[propargylmethylamino]-phenyl-N-methylcarbamate
2-[dipropargylamino]-phenyl-N-methylcarbamate
3-methyl-4-[dipropargylamino]-phenyl-N-methylcarbamate
3,5-dimethyl-4-[dipropargylamino]-phenyl-N-methylcarbamate 2-[allylisopropylamino]-phenyl-N-methylcarbamate Nitrophenols and derivatives 4,6-dinitro-6-methylphenol, Na-salt (Dinitrocresol)
dinitrobutylphenol-(2,2'2''-triethanolamine salt
2-cyclohexyl-4,6-dinitrophenol (Dinex)
2-(1-methylheptyl)-4,6-dinitrophenyl-crotonate (Dinocap)
2-sec.-butyl-4,6-dinitrophenyl-3-methyl-butenoate (binapacryl)
2-sec.-butyl-4,6-dinitrophenyl-cyclopropionate
2-sec.-butyl-4,6-dinitrophenylisopropylcarbonate (Dinobuton)

Miscellaneous pyrethin I
Pyrethin II
3-allyl-2-methyl-4-oxo-2-cyclopenten-1-yl-chrysanthemumate (Allethrin)
6-chloriperonyl-chrysanthemumate (Barthrin)
2,4-dimethylbenzyl-chrysanthemumate (Dimethrin)
2,3,4,5-tetrahydrophthalimidomethylchrysanthemumate
4-chlorobenzyl-4-chlorophenylsulphide (Chlorbenside)
6-methyl-2-oxol,3-dithiolo-[4,5-b]-quinoxaline (Quinomethionate)
(I)-3-(2-furfuryl)-2-methyl-4-oxocyclopent-2-enyl(I)-(cis + trans)chrysanthemum-monocarboxylate (Furethrin)
2-pivaloyl-indane-1,3-dione (Pindon)
N'-(4-chloro-2-methylphenyl)-N,N-dimethylformamidine (Chlorphenamidin)
4-chlorobenzyl-4-fluorophenyl-sulphide (Fluorbenside)
5,6-dichloro-1-phenoxycarbanyl-2trifluoromethyl-benzimidazole (Fenozaflor)
p-chlorophenyl-p-chlorobenzenesulphonate (Ovex)
p-chlorophenyl-benzenesulphonate (Fenson)
p-chlorophenyl-2,4,5-trichlorophenylsulphone (Tetradifon)
p-chlorophenyl-2,4,5-trichlorophenylsulphide (Tetrasul)
p-chlorobenzyl-p-chlorophenylsulphide (Chlorbenside)
2-thio-1,3-dithiolo-(,5-6)-quinoxaline (Thiochinox)
prop-2-ynyl-(4-t-butylphenoxy)-cyclohexylsulphite (Propargil).

Furthermore, the new compounds of formula I possess extraordinarily good nematicidal properties, and can be used, for example, for the control of the following plant-parasitic nematodes: Meloidogyne spp., Heterodera spp., Ditylenchus Pratylenchus spp., Paratylenchus spp., Anguina spp., Helicotylenchus spp., Tylenchorhynchus spp., Rotylenchulus spp., Tylenchulus semipentrans, Radopholus similus, Belonolaismus spp., Trichodorus spp., Longidorus spp., Aphelenchoides spp., Xyphinema spp..

In addition to possessing the above mentioned properties, the compounds of formula I exhibit, applied in very small amounts, a favourable degree of effectiveness against members of the class Thallophyta.

Thus, some of these compounds have a bactericidal action. They are, however, particularly effective against fungi, especially against the phytopathogenic fungi belonging to the following classes, orders or species.

Oomycetes, such as Plasmodiphora-species, Aphanomyces-species, Pythium-species, Phytophthora-species, e.g. (*Phytophthora infestans, Phytophthora cactorum*, Plasmopara-species, e.g. (*Plasmopara viticola*), Bremia-species (*Bremia lactucae*), Peronospora-species, e.g. (*Peronospora tabacina*), Pseudoperonospora-species, e.g. (*Pseudoperonospora humuli*).

Zygomycetes, such as Rhizopus-species.

Ascomycetes, such as Eurotiales, such as Aspergillus-species, Penicillium-species, e.g. (*Penicillium digitatum, Penicillium italicum*), Taphrinales, such as Taphrina-species, e.g. (*Taphrina deformans*), Erysiphales, such as Erysiphes-species, e.g. (*Erysiphes Cichoracearum, Erysiphes graminis*), Podosphaera leucotricha, Sphaerotheca-species (*Sphaerotheca pannosa*), Uncinula-species (*Uncinula necator*), Helotiales, such as Monilinia-species (*Monilinia [Sclerotinia] fructicola, Monilinia laxa*), Diplocarpon-species (*Diplocarpon rosae*), Pseudopeziza-species, Sphaeriales, such as Nectria-species (*Nectria galligena*), Ceratocystis-species, Pseudosphaeriales, such as Venturia-species, (*Venturia inaequalis*), Mycosphaerella-species, Ophiobolus-species (*Ophiobolus graminis*), Cochliobolus-species ([*Helminthosporium*] *miyabeanus*), Cercospora-species (*Cercospora beticola, Cercospora musae*).

Basidiomycetes such as Aphyllophorales, Pellicularia-species, e.g. (*Pellicularia filamentora* = [*Rhizoctonia solani*]), Uredinales such as Puccinia-species, e.g. (*Puccinia triticina*), Uromyces-species (*Uromyces phaseoli*), Hemileia-species (*Hemileia vastatrix*), Cronartium-series (*Cronartium ribicola*), Phragmidium-species (*Phragmidium subcorticium*), Gymnosporangium species.

Denteromycetes = (*Fungi imperfecti*) such as Piricularia-species, e.g. (*Piricularia oryzae*), Corynespora-species, Thielaviopsis-species. Clasterosporium-species, Botrytis-species, (*Botrytis cinerea*), Cladosporium-species, Alternaria-species (*Alternaria solani*), Verticillium-species (*Verticillium albo-atrum*), Phialophora-species, Melanconiales, such as Colletotrichum-species, Fusarium-species, such as (*Fusarium oxysporum, Fusarium nivale*), Gloesporium-species (*Gloesporium fruchtigenum*), Sphaeropsidales, e.g. Septoria-species (*Septoria apicola*), Diplodia-species (*Diplodia natalensis*), Mycelia sterilia, e.g. Sclerotium series (*Sclerotium rolfsii*).

The compounds of formula I likewise have a fungitoxic action in the case of fungi which attack the plants from the soil and cause, in some cases, tracheomycose, such as, e.g. *Fusarium cubense, Fusarium dianthi, Verticillium alboatrum* and *Phialophora cinereceus*.

Moreover, the new active substances can be used for the treatment of seeds, fruit, tubers, etc., for the protection against fungus infections, e.g. as a result of smut fungi of all kinds, such as:

Ustilaginales such as Ustilago-species (*Ustilago avenae*), Tilletia-species (*Tilletia tritici*), Urocystis- and Tuburcinia-species, Phoma-species (*Phoma betae*).

By virtue of their biocidal properties, the compounds of formula I are suitable for disinfection, and for the proe protection of diverse materials against infestation by bacteria and fungi. It is shown to be in this respect particularly advantageous that the compounds of formula I, in concentrations such as are required for disinfection and for the protection of materials, have no toxic side effects in the case of warm-blooded animals.

The compounds of formula I can contain, besides the mentioned insecticides and acaricides, other fungicides, fungistitica or bacteriostatica in various mixture ratios, the compound mixtures thus obtained having advantages compared with the individual constituents. The following are, for example, suitable for being made up with the active substances of formula I:

dodecylguanidineacetate (DODINE),
pentachloronitrobenzene (QUINTOZENE),
pentachlorophenol (PCP),
2-(1-methyl-n-propyl)-4,6-dinitrophenyl-2-methylcrotonate (BINAPACRYL),
2-(1-methyl-n-heptyl-4,6-dinitrophenylcrotonate (DINOCAP),
2,6-dichloro-4-nitroaniline (DICHLORAN),
2,3,5,6-tetrachlorobenzoquinone (1,4) CHLORANIL),
2,3-dichloronaphthoquinone (1,4) DICHLONE),
N-(Trichloromethylthio)-phthalimide (FOLPAT),
N-(trichloromethylthio)cyclohex-4-ene-1,2-dicarboximide (CAPTAN),
N-(1,1,2,2-tetrachloroethylthio)cyclohex-4-ene-1,2-dicarboximide (CAPTAFOL),
N-methanesulphonal-N-trichloromethylthio-chloroaniline,
N'-dichlorofluoromethylthio-N-dimethyl-n'-phenylsulphamide (DICHLORFLUAMID),
O-ethyl-S-benzyl-phenyldithiophosphate,
O,O-diethyl-S-benzyl-thiolphosphate,
disodium-ethylene-1,2-bis-dithiocarbamate (NABAM),
zinc-ethylene-1,2-bis-dithiocarbamate ZINEB),
manganese(II)-ethylene-1,2-bis-dithiocarbamate MANEB)
tetamethylthiuramdisulphide THIRAM)
1-oxy-3-acetyl-6-methyl-cyclohexene-(5)dione-(2,4) (DEHYDROACETIC ACID),
8-hydrooxyquinilone (8-QUINOLINOL),
2-dimethylamino-6-methyl-5-n-butyl-4-hydroxypyrimidine,
methyl-N-benzimidazol-2-yl-N-(butylcarbamoyl)carbamate (BENOMYL),
2-ethylamino-6-methyl-5n-butyl-4-hydroxypyrimidine,
2,3-dicyano-1,4-dithia-anthraquinone (DITHIANON),
2-(4-thiazolyl)-benzimidazole,
3,5-dimethyltetrahydro-1,3,5-thiadiazine-2-thione (DAZOMET),
2,3-dihydro-5-carboxanilido-6-methyl-1,4-oxathine,
pentachlorobenzyl alcohol.

The compounds of formula I can be used on their own or together with suitable carriers and/or additives. Suitable carriers and additives may be solid or liquid, and correspond to the substances common in formulation practice, such as, e.g. natural and regenerated substances, solvents, dispersing agents, wetting agents, adhesives, thickeners, binders and/or fertilisers.

For application, the compounds of formula I can be processed into the form of dusts, emulsion concentrates, granulates, dispersions, sprays, or solutions, the formulation of these preparations being effected in a manner commonly known in practice. Also to be mentioned are cattle dips and spray races, in which aqueous preparations are used.

The agents according to the invention are produced in a manner known per se by the intimate mixing and- /or grinding of active substances of formula I with the suitable carriers, optionally with the addition of dispersing agents or solvents which are inert to the active substances. The active substances can be obtained and used in the following preparation forms:

solid preparations:
dusts, scattering agents, granulates, coated granulates, impregnated granulates and homogeneous granulates;

liquid preparations:
a. water dispersible active substance concentrates: wettable powders, pastes, emulsions;
b. solutions.

The solid preparations (dusts, scattering agents) are produced by the mixing of the active substances with solid carriers. Suitable carriers are, e.g. kaolin, talcum, bole, loess, chalk, limestone, ground limestone, Atta-clay, dolomite, diatomaceous earth, precipitated silicic acid, alkaline-earth silicates, sodium and potassium aluminium silicates (feldspar and mica), calcium and magnesium sulphates, magnesium oxide, ground synthetic materials, fertilisers such as ammonium sulphate, ammonium phosphate, ammonium nitrate, urea, ground vegetable products such as bran, bark dust, sawdust, ground nutshells, cellulose powder, residues of plant extractions, active charcoal, etc., alone or in admixture with each other.

The particle size of the carriers is for dusts advantageously up to about 0.1 mm; for scattering agents from about 0.075 mm to 0.2 mm; and for granulates 0.2 mm or coarser.

To these mixtures may also be added additives stabilising the active substance, and/or non-ionic, anion-active and cation-active substances which, for example, improve the adhesiveness of the active substances on plants and on parts of plants (adhesives and agglutinants), and/or ensure better wettability (wetting agents) and dispersibility (dispersing agents).

The following substances are, for example, suitable: olein/chalk mixture, cellulose derivatives (methyl cellulose, carboxymethyl cellulose), hydroxyethylene glycol ethers of monoalkyl and dialkyl phenols having 5 to 15 ethylene oxide radicals per molecule and 8 to 9 carbon atoms in the alkyl radical, ligninsulphonic acid, the alkali metal and alkaline-earth metal salts thereof, polyethylene gylcol ethers (carbowaxes), fatty alcohol polyglycol ethers having 5 to 20 ethylene oxide radicals per molecule and 8 to 18 carbon atoms in the fatty alcohol moiety, condensation products of ethylene oxide, propylene oxide, polyvinylpyrrolidones, polyvinyl alcohols, condensation products of urea and formaldehyde, as well as latex products.

Water-dispersible concentrates of active substances, i.e. wettable powders, pastes and emulsion concentrates, are agents which can be diluted with water to obtain any desired concentration. They consist of active substance, carrier, optionally additives which stabilise the active substance, surface-active substances, and anti-foam agents and, optionally, solvents.

The wettable powders and pastes are obtained by the mixing and grinding of the active substances with dispersing agents and pulverulent carriers, in suitable devices, until homogeneity is obtained. Suitable carriers are, e.g. those previously mentioned in the case of solid preparations. It is advantageous in some cases to use mixtures of different carriers. As dispersing agents it is possible to use, e.g.: condensation products of sulphonated naphthalene and sulphonated naphthalene derivatives with formaldehyde, condensation products of napthalene or of naphthalenesulphonic acids with phenol and formaldehyde, as well as alkali, ammonium and alkaline-earth metal salts of ligninsulphonic acid, also alkylarylsulphonates, alkali metal salts and alkaline-earth metal salts of dibutyl naphthalenesulphonic acid, fatty alcohol sulphates such as salts of sulphated hexadecanols, heptadecanols, octadecanols, and salts of sulphated fatty alcohol glycol ether, the sodium salt of oleyl methyl tauride, ditertiary acetylene glycols, dialkyl dilauryl ammonium chloride, and fatty acid alkali-metal and alkaline-earth metal salts.

Suitable anti-foam agents are, e.g. silicones.

The active substances are so mixed, ground, sieved and strained with the above mentioned additives that the solid constituent in the case of wettable powders has a particle size not exceeding 0.02 to 0.04 mm, and in the case of pastes not exceeding 0.03 mm. For the preparation of emulsion concentrates and pastes, dispersing agents are used such as those mentioned in the preceding paragraphs, organic solvents and water. Suitable solvents are, e.g. alcohols, benzene, xylene, toluene, dimethylsulphoxide, and mineral oil fractions boiling in the range of 120° to 350°C. The solvents must be practically odourless, nonphytotoxic, and inert to the active substances.

Furthermore, the agents according to the invention can be used in the form of solutions. For this purpose, the active substance, or several active substances, of the general formula I is dissolved in suitable organic solvents, solvent mixtures, or water. As organic solvents it is possible to use aliphatic and aromatic hydrocarbons, their chlorinated derivatives, alkylnaphthalenes, mineral oils on their own or in admixture with each other.

The content of active substance in the above described agents is between 0.1 and 95%; it is to be mentioned in this connection that in the case of application of the agents from an aeroplane, or by means of some other suitable application devices, concentrations of up to 99.5% can be used, or even the pure active substance.

The active substances of formula I can be prepared, e.g. as follows:

Dusts

The following substances are used for the preparation of a) a 5% dust, and b) a 2% dust:
a. 5 parts of active substance
95 parts of talcum.
b. 2 parts of active substance
1 part of highly dispersed silicic acid 97 parts of talcum.

The active substances are mixed and ground with the carriers.

The following substances are used to produce a 5 % granulate:
5 parts of active substance,
0.25 parts of epichlorhydrin,
0.25 parts of cetyl polyglycol ether,
3.50 parts of polyethylene glycol,
91 parts of kaolin (particle size 0.3 — 0.8 mm).

The active substance is mixed with epichlorhydrin and dissolved with 6 parts of acetone; the polyethylene glycol and cetyl polyglycol ether are then added. The thus obtained solution is sprayed on to kaolin, and the acetone subsequently evaporated in vacuo.

Wettable powder

The following constituents are used for the preparation of a) a 40%, b) and c) a 25%, and d) a 10% wettable powder:

a. 40 parts of active substance,
5 parts of sodium lignin sulphonate,
1 part of sodium dibutyl-naphthalene sulphonate,
54 parts of silicic acid.

b. 25 parts of active substance,
4.5 parts of calcium lignin sulphonate
1.9 parts of Champagne chalk/hydroxyethyl cellulose mixture (1:1),
1.5 parts of sodium dibutyl naphthalene sulphonate,
19.5 parts of silicic acid,
19.5 parts of Champagne chalk,
28.1 parts of kaolin.

c. 25 parts of active substance,
2.5 parts of isooctylphenoxy-polyoxyethylene-ethanol,
1.7 parts of Champagne chalk/hydroxyethyl cellulose mixture (1:1),
8.3 parts of sodium aluminium silicate,
16.5 parts of kieselguhr,
46 parts of kaolin.

d. 10 parts of active substance,
3 parts of a mixture of the sodium salts of saturated fatty alcohol sulphates,
5 parts of naphthalenesulphonic acid/formaldehyde condensate,
82 parts of kaolin.

The active substances are intimately mixed, in suitable mixers, with the additives, the mixture being then ground in the appropriate mills and rollers. Wettable powders are obtained which can be diluted with water to give suspensions of any desired concentration.

Emulsifiable concentrates

The following substances are used to produce a) a 10% and b) a 25% emulsifiable concentrate:

a. 10 parts of active substance,
3.4 parts of epoxidised vegetable oil,
13.4 parts of a combination emulsifier consisting of fatty alcohol polyglycol ether and alkylarylsulphonate calcium salt,
40 parts of diemthylformamide,
43.2 parts of xylene.

b. 25 parts of active substance,
2.5 parts of epoxidised vegetable oil,
10 parts of an alkylarylsulphonate/fatty alcoholpolyglycol ether mixture
5 parts of diemthylformamide,
57.5 parts of xylene.

From these concentrates it is possible to produce, by dilution with water, emulsions of any desired concentration.

Spray

The following constituents are used to prepare a 5% spray:
5 parts of active substance,
1 part of epichlorhydrin,
94 parts of benzine (boiling limits 160°-190°C).

EXAMPLE 1

An amount of 39.4 g of sodium salt of 1-methyl-3-phenyl-5-hydroxy-1,2,4-triazole is suspended in 400 ml of acetonitrile. To this suspension are added dropwise 34.4 g of O-ethyl-ethylthiophosphonic acid chloride, and the mixture is subsequently refluxed for 2 hours. The mixture is filtered after cooling. The solvent of the filtrate is distilled off in vacuo, leaving as residue 54 g of crude O-ethyl-O-[1-methyl-3-phenyl-1,2,4-triazolyl-(5)]-ethyl-thionophosphonic acid ester in the form of a light-yellow oil. To obtain an analytically pure preparation, the crude product is chromatographed through the 20-fold amount of silica gel (0.05 - 0.2 mm) with methylene chloride. In this manner are obtained 31.2 g of pure product as light-yellow oil. ($n_D^{20} = 1.5595$)

Analysis:
Calculated: N 13.50 P 9.95 S 10.30 %
Found: 13.40 10.00 10.70

EXAMPLE 2 a. 117 g of 1-isopropylsemicarbazide in 300 ml of orthoformic acid ethyl ester are maintained for 3 hours at 130°, whereby 200 ml of ethanol distil off. The solution is allowed to cool to room temperature; the precipitated product is then filtered off, and recrystallised from ethyl acetate. In this manner are obtained 81 g of 1-isopropyl-3-hydroxy-1,2,4-triazole, M.P.: 123° – 124°C.

Analysis:
Calculated: C 47.3 H 7.1 N 33.1 O 12.6 %
Found: 47.2 7.3 32.8 12.7 b. 17.8 g. of 1-isopropyl-3-hydroxy-1,2,4-triazole are refluxed with 10 g of potassium carbonate in 250 ml of methyl ethyl ketone. After cooling of the mixture, a solution of 17.3 g of O-ethyl-ethyl-thiophosphonic acid chloride in 50 ml of methyl ethyl ketone is added dropwise with stirring, the whole being then refluxed for half an hour. The precipitate is filtered off after 12 hours' stirring at room temperature; and the filtrate is afterwards concentrated in vacuo. After purification by chromatography through silica gel (0.05 - 0.2 mm) with acetone, O-ethyl-O-[1-isopropyl-1,2,4-triazolyl-(3)]-ethyl-thiophosphonic acid ester having the refractive index: $N_D^{20} = 1.4980$ are obtained.

Analysis:
Calculated: C 41.1 H 6.9 N 15.9 P 11.8 S 12.2 %
Found: 41.7 7.0 15.5 11.3 12.0

The following compounds are produced analogously to Examples 1 and 2:

| Compounds: | Refractive index: $n_D^{20}$ |
| --- | --- |
| O-Ethyl-O-[thyl-O-[1-phenyl-5-methyl-1,2,4-triazolyl-(3)]-ethyl-thiophosphonate | 1,5586 |
| O-Methyl-O-[1-phenyl-1,2,4-triazolyl-(3)-]-ethyl-thiophosphonate | 1,5761 |
| O-Ethyl-O-[1-isopropyl-1,2,4-triazolyl-(3)]-ethyl-thiophosphonate | 1,4980 |
| O-Ethyl-O-[1-ethyl-1,2,4-triazolyl-(3)]-ethyl-thiophosphonate | 1,5059 |
| O-Ethyl-[1-isopropyl-5-methyl-1,2,4-triazolyl-(3)]-ethyl-thiophosphonate | 1,4980 |
| O-Ethyl-[1-cyclohexyl-1,2,4-triazolyl-(3)]-ethyl-thiophosphonate | 1,5078 |
| O-Ethyl-O-[1-cyclopentyl-1,2,4-triazolyl-(3)]-ethyl-thiophosphonate | 1,5154 |
| O-Ethyl-O-[1-n-propyl-1,2,4-triazolyl-(3)]-ethyl-thiophosphonate | 1,4936 |

-Continued

| Compounds: | Refractive index: $n_D^{20}$ |
|---|---|
| O-Ethyl-O-[1-phenyl-1,2,4-triazolyl-(3)]-ETHYL—THIOPHOSPHONATE | M.P. 31–34°C |
| O-Ethyl-O-[1-methyl-3-phenyl-1,2,4-triazolyl-(5)]-ethyl-thiophosphonate | 1,5595 |
| O-Ethyl-O-[1-sec.butyl-1,2,4-triazolyl-(3)]-ethyl-thiophosphonate | 1,4933 |
| O-Ethyl-O-[1-(2'-methylbutyl)-1,2,4-triazolyl-(3)]-ethyl-thiophosphonate | 1,4929 |
| O-Ethyl-O-[1-n-hexyl-1,2,4-triazolyl-(3)]-ethyl-thiophosphonate | 1,4900 |
| O-Ethyl-O-[1-isobutyl-1,2,4-triazolyl-(3)]-ethyl-thiophosphonate | 1,4930 |
| O-Ethyl-O-[1-ethyl-5-phenyl-1,2,4-triazolyl-(3)]-ethyl-thiophosphonate | 1,5492 |
| O-Ethyl-O-[1-ethyl-1,2,4-triazolyl-(3)]-phenyl-thiophosphonate | 1,5536 |
| O-Ethyl-O-[1-ethyl-5-methyl-1,2,4-triazolyl-(3)]-ethyl-thiophosphonate | 1,4979 |
| O-(n)-Propyl-O-[1-isopropyl-1,2,4-triazolyl-(3)]-methyl-thiophosphonate | 1,4963 |
| O-(n)-Propyl-O-[1-isopropyl-5-methyl-1,2,4-triazolyl-(3)]-methyl-thiophosphonate | 1,4944 |
| O-(n)-Propyl-O-[1-phenyl-5-methyl-1,2,4-triazolyl-(3)]-methyl-thiophosphonate | 1,5509 |
| O-Ethyl-O-[1-(n)-butyl-1,2,4-triazolyl-(3)]-ethyl-thiophosphonate | 1,4978 |
| O-Ethyl-(O)-[1-sec.pentyl-1,2,4-triazolyl-(3)]-1-ethyl-thiophosphonate | 1,4912 |
| O-Ethyl-O-[1-sec.hexyl-1,2,4-triazolyl-(3)]-1-ethyl-thiophosphonate | 1,4912 |
| O-Ethyl-O-[1-sec. neo hexyl-1,2,4-thiazolyl-(3)]-1-ethyl-thiophosphonate | 1,4939 |
| O-Ethyl-O-[1-ethylpropyl-1,2,4-triazolyl-(3)]-1-ethyl-thiophosphonate | 1,4932 |
| O-Ethyl-O-[1-isopropyl-5-ethyl-1,2,4-triazolyl-(3)]-1-ethyl-thiophosphonate | 1,4971 |
| O-Ethyl-O-[1,5-diisopropyl-1,2,4-triazolyl-(3)]-1-ethyl-thiophosphonate | 1,4952 |
| O-Ethyl-O-[1-(2'-chlorphenyl)-1,2,4-triazolyl-(3)]-1-ethyl-thiophosphonate | 1,5602 |
| O-Ethyl-O-[1-(2'-chlorphenyl)-5-methyl-1,2,4-triazolyl-(3)]-1-ethyl-thiophosphonate | 1,5631 |
| O-Ethyl-O-[1-(3'-chlorphenyl)-1,2,4-triazolyl-(3)]-1-ethyl-thiophosphonate | M.P. 54–64°C |
| O-Ethyl-O-[1-(3'-chlorphenyl)-5-methyl-1,2,4-triazolyl-(3)]-1-ethyl-thiophosphonate | 1,5520 |
| O-Ethyl-O-[1-(4'-chlorphenyl)-1,2,4-triazolyl-(3)]-1-ethyl-thiophosphonate | 1,5591 |
| O-Ethyl-O-[1-(4'-chlorphenyl)-5-methyl-1,2,4-triazolyl-(3)]-1-ethyl-thiophosphonate | 1,5535 |
| O-Ethyl-O-[1-(2',5'-dichlorphenyl)-1,2,4-triazolyl-(3)]-ethyl-thiophosphonate | 42–43°C |
| O-Ethyl-O-[1-(2',5'-dichlorphenyl)-5-methyl-1,2,4-triazolyl-(3)]-ethyl-thiophosphonate | 81–82°C |
| O-Ethyl-O-[1-(3'-chlorphenyl)-5-isopropyl-1,2,4-triazolyl-(3)]-ethyl-thiophosphonate | 1,5565 |
| O-Ethyl-O-[1-phenyl-5-ethyl-1,2,4-triazolyl-(3)]-ethyl-thiophosphonate | 1,5462 |

-Continued

| Compounds: | Refractive index: $n_D^{20}$ |
|---|---|
| O-Ethyl-O-[(4'-bromphenyl)-5-methyl-1,2,4-triazolyl-(3)]-ethyl-thiophosphonate | 1,5471 |
| O-Methyl-O-[1-phenyl-1,2,4-triazolyl-(3)]-methyl-thiophosphonate | |
| O-Methyl-O-[1-phenyl-5-methyl-1,2,4-triazolyl-(3)]-methyl-thiophosphonate | |
| O-Methyl-O-[1-(3'-chlorphenyl)-5-methyl-1,2,4-triazolyl-(3)]-methyl-thiophosphonate | |
| O-Methyl-O-[1-isopropyl-1,2,4-triazolyl-(3)]-methyl-thiophosphonate | |
| O-Methyl-O-[1-propyl-1,2,4-triazolyl-(3)]-methyl-thiophosphonate | |
| O-Ethyl-O-[1-phenyl-1,2,4-triazolyl-(3)]-methyl-thiophosphonate | |
| O-Ethyl-O-[1-phenyl-5-methyl-1,2,4-triazolyl-(3)]-methyl-thiophosphonate | |
| O-Ethyl-O-[1-(3'-chlorphenyl)-5-methyl-1,2,4-triazolyl-(3)]-methyl-thiophosphonate | |
| O-Ethyl-O-[1-isopropyl-1,2,4-triazolyl-(3)]-methyl-thiophosphonate | |
| O-Ethyl-O-[1-propyl-1,2,4-triazolyl-(3)]-methyl-thiophosphonate | |
| O-Propyl-O-[1-phenyl-1,2,4-triazolyl-(3)]-methyl-thiophosphonate | |
| O-Propyl-O-[1-(3'-chlorphenyl)-5-methyl-1,2,4-triazolyl-(3)]-methyl-thiophosphonate | |
| O-Propyl-O-[1-propyl-1,2,4-triazolyl-(3)]-methyl-thiophosphonate | |
| O-Butyl-O-[1-phenyl-1,2,4-triazolyl-(3)]-methyl-thiophosphonate | |
| O-Butyl-O-[1-phenyl-5-methyl-1,2,4-triazolyl-(3)]-methyl-thiophosphonate | |
| O-Butyl-O-[1-(3'-chlorphenyl)-5-methyl-1,2,4-triazolyl-(3)]-methyl-thiophosphonate | |
| O-Butyl-O-[1-isopropyl-1,2,4-triazolyl-(3)]-methyl-thiophosphonate | |
| O-Butyl-O-[1-propyl-1,2,4-triazolyl-(3)]-methyl-thiophosphonate | |
| O-Isopropyl-O-[1-phenyl-1,2,4-triazolyl-(3)]-methyl-thiophosphonate | |
| O-Isopropyl-O-[1-phenyl-5-methyl-1,2,4-triazolyl-(3)]-methyl-thiophosphonate | |
| O-Isopropyl-O-[1-(3'-chlorphenyl)-5-methyl-1,2,4-triazolyl-(3)]-methyl-thiophosphonate | |
| O-Isopropyl-O-[1-isopropyl-1,2,4-triazolyl-(3)]-methyl-thiophosphonate | |
| O-Isopropyl-O-[1-propyl-1,2,4-triazolyl-(3)]-methyl-thiophosphonate | |
| O-n-Pentyl-O-[1-phenyl-1,2,4-triazolyl-(3)]-methyl-thiophosphonate | |
| O-n-Pentyl-O-[1-phenyl-5-methyl-1,2,4-triazolyl-(3)]-methyl-thiophosphonate | |
| O-n-Pentyl-O-[1-(3'-chlorphenyl)-5-methyl-1,2,4-triazolyl-(3)]-methyl-thiophosphonate | |
| O-n-Pentyl-O-[1-isopropyl-1,2,4-triazolyl-(3)]-methyl-thiophosphonate | |
| O-n-Pentyl-O-[1-propyl-1,2,4-triazolyl-(3)]-methyl-thiophosphonate | |
| O-n-Pentyl-O-[1-phenyl-1,2,4-triazolyl-(3)]-ethyl-thiophosphonate | |
| O-n-Pentyl-O-[1-phenyl-5-methyl-1,2,4-triazolyl-(3)]-ethyl-thiophosphonate | |
| O-n-Pentyl-O-[1-(3'-chlorphenyl)-5-methyl-1,2,4-triazolyl-(3)]-ethyl-thiophosphonate | |
| O-n-Pentyl-O-[1-isopropyl-1,2,4-triazolyl-(3)]-ethyl-thiophosphonate | |
| O-n-Pentyl-O-[1-propyl-1,2,4-triazolyl-(3)]-ethyl-thiophosphonate | |
| O-Methyl-O-[1-phenyl-1,2,4-triazolyl-(3)]-phenyl-thiophosphonate | |

Analogously to Example 2 a) are also produced, for example, the following starting materials of formula II:

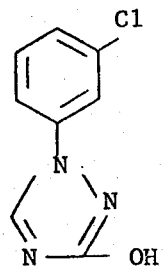

M.P. 310°C (decomposition)

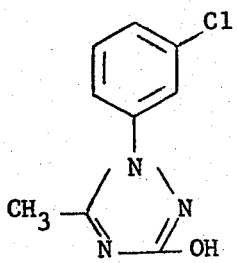

M.P. 216 - 218°C

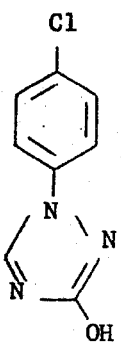 M.P. 322°C
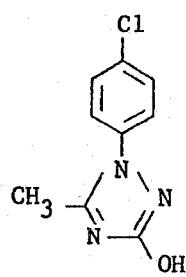 M.P. 320-322°C
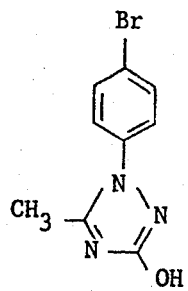 M.P. 228-245°C (decomposition)
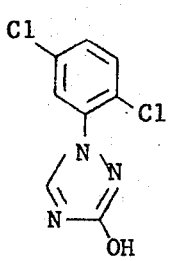 M.P. 216-217°C
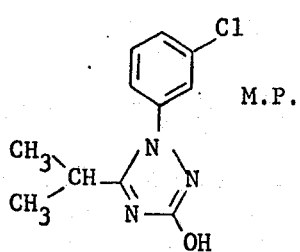 M.P. 170-172°C
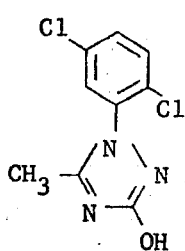 M.P. 268-271°C
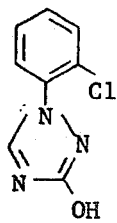 M.P. 168-171°C
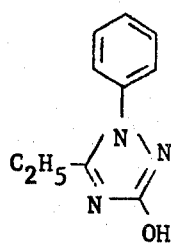 M.P. 190°C

EXAMPLE 3 a. Insecticidal contact poison action
Action against Musca domestica

From acetonic active substance solutions, active substance coatings of 0.15 g and 1.5 g of active substance per square metre are applied in Petri dishes. After 1 hour, polyvalent-resistant house-flies (Musca domestica) are placed into the dishes.

In the following table are given the times after which 90 to 100% of the flies were in dorsal position.

Table 1a

| Active Substance | 90–100% of the flies in dorsal position after X minutes | |
|---|---|---|
| | House-flies | |
| | 1,5 g/m² | 0,15 g/m² |
| O-Ethyl-O-[1-methyl-3-phenyl-1,2,4-triazolyl(5)]-ethyl-thiophosphonic acid ester | 100 | 120 |
| O-Ethyl-O[1-phenyl-1,2,4-triazolyl-(3)]-ethyl-thiophosphonic acid ester | 60 | 90 |
| O-Methyl-O-[1-phenyl-1,2,4-triazolyl-(3)]-ethyl-thiophosphonic acid ester | 100 | 120 |
| O-Ethyl-O-[1-isopropyl-1,2,4-triazolyl-(3)]-ethyl-thiophosphonic acid ester | 50 | 120 |
| O-Ethyl-O-[1-ethyl-1,2,4-triazolyl-(3)]-ethyl-thiophosphonic acid ester | 30 | 90 |
| O,O-Diethyl-O-[1-phenyl-1,2,4-triazolyl-(3)]-thiophosphate (known from the German Patent Specification open for inspection No. 1,299,924) | 120 | 5 hours (10%) | stance to be tested, the spraying being carried out from all sides (contact effect), or only from above in the direction of the axis of the shoot (penetration effect). In the latter case, the test insects located on the underside of the leaves are not touched by the spray. If 100% destruction of the insects had occurred already after 2 days, then infestation of the plant was repeated.

Table 1b

| Active substance | 100% destruction with an active substance concentration of × ppm |
|---|---|
| O-Ethyl-O-[1-isobutyl-1,2,4-triazolyl-(3)]-ethyl-thiophosphonate | 50 |
| O-Ethyl-O-[1-cyclopentyl-1,2,4-triazolyl-(3)]-ethyl-thiophosphonate | 50 |
| O-Ethyl-O-[1-(n)-hexyl-1,2,4-triazolyl-(3)]-ethyl-thiophosphonate | 50 |
| O-Ethyl-O-[1-sec.butyl-1,2,4-triazolyl-(3)]-ethyl-thiophosphonate | 50 |
| O-Ethyl-O-[1-ethyl-5-methyl-1,2,4-triazolyl-(3)]-ethyl-thiophosphonate | 50 |
| O-(n)-propyl-O-[1-isopropyl-5-methyl-1,2,4-triazolyl-(3)]-methyl-thiophosphonate | 50 | b. Insecticidal stomach poison action

Tobacco, cotton and potato plants are sprayed with a 0.05% aqueous active substance emulsion (obtained from a 10% emulsifiable concentrate). After the drying of the coating, Egyptian cotton leaf worms (Spodoptera litoralis) are placed onto the tobacco plants, cotton stainers (Dysdercus fasciatus) onto the cotton plants, and Colorada beetle larvae (Leptinotarsa decemlineata) onto the potato plants. The test is carried out at 24°with 60% relative humidity.

In the following Tables 2,3 and 4, the time in hours is given after which 100 % of the insects were in dorsal portion.

Action against Aphis fabae

Young Vicia faba plants approximately 6 cm in height were infected by parts of plants infested by Aphis fabae. The starting conditions for the active substance test were established after 5 days by virtue of the further growth of the plants and the correspondingly great increase in the number of aphids present. The infested plant was sprayed with an emulsion of the active sub- Table 2

| Active substance | 100% of the insects in dorsal position after X hours |
|---|---|
| | Colorada beetle larvae |
| O-Methyl-O-[1-phenyl-1,2,4-triazolyl-(3)]-ethyl-thiophosphonic acid ester | 5 hours |
| O-Ethyl-O-[1-isopropyl-1,2,4-triazolyl-(3)]-ethyl-thiophosphonic acid ester | 2 hours |
| O-Ethyl-O-[1-cyclohexyl-1,2,4-triazolyl-(3)]-ethyl-thiophosphonic acid ester | 2 hours |

Table 2—Continued

| Active substance | 100% of the insects in dorsal position after X hours<br>Colorada beetle larvae |
|---|---|
| O-Ethyl-O-[1-ethyl-1,2,4-triazolyl-(3)]-ethyl-thiophosphonic acid ester | 2 hours |
| O-Ethyl-O-[1-cyclopentyl-1,2,4-triazolyl-(3)]-ethyl-thiophosphonic acid ester | 5 hours |
| O-Ethyl-O-[1-n-propyl-1,2,4-triazolyl-(3)]-ethyl-thiophosphonate | 2 hours |
| O-Ethyl-O-[1-n-hexyl-1,2,4-triazolyl-(3)]-ethyl-thiophosphonate | 2 hours |
| O-Ethyl-O-[1-sec.butyl-1,2,4-triazolyl-(3)]-ethyl thiophosphonate | ½ hour |
| O-Ethyl-O-[1-ethyl-5-methyl-1,2,4-triazolyl-(3)]-ethyl-thiophosphonate | 2 hours |
| O-(n)-Propyl-O-[1-isopropyl-5-methyl-1,2,4-triazolyl-(3)]-methyl-thiophosphonate | 1 hour |
| O-Ethyl-O-[1-(2'-methylbutyl)-1,2,4-triazolyl-(3)]-ethyl-thiophosphonate | 2 hours |
| O-(n)-Propyl-O-[1-phenyl-5-methyl-1,2,4-triazolyl-(3)]-methyl-thiophosphonate | 4 hours |
| O,O-Dimethyl-S-(1,2-dicarbethoxy-ethyl)dithiophosphate (known from the German Patent No. 847,897) | no effect |
| O,O-Diethyl-O-[2-isopropyl-4-methyl-pyrimidyl-(6)]-thiophosphate (known from the German Patent No. 910,652) | 48 hours (50%) |

Table 3

| Active substance | 100% of the insects in dorsal position after X hours<br>Cotton stainers |
|---|---|
| O-Ethyl-O-[1-phenyl-1,2,4-triazolyl-(3)]-ethyl-thiophosphonic acid ester | 24 hours |
| O-Ethyl-O-[1-cyclohexyl-1,2,4-triazolyl-(3)]- | 24 hours |
| O-Ethyl-O-[1-ethyl-1,2,4-triazolyl-(3)]-ethyl-thiophosphonic acid ester | 24 hours |
| O-Ethyl-O-[1-cyclopentyl-1,2,4-triazolyl-(3)]-ethyl-thiophosphonic acid ester | 24 hours |
| O,O-Dimethyl-S-(1,2-dicarbethoxy-ethyl)-dithiophosphate (known from the German Patent No. 847,897) | 48 hours (55 %) |

Table 4

| Active substance | 100% of the insects in dorsal position after X hours<br>Egyptian cotton leaf worms |
|---|---|
| O-Ethyl-O-[1-phenyl-1,2,4-triazolyl-(3)]-ethyl-thiophosphonic acid ester | 1 hour |
| O-Methyl-O-[1-phenyl-1,2,4-triazolyl-(3)]-ethyl-thiophosphonic acid ester | 2 hours |
| O-Ethyl-O-[1-isopropyl-1,2,4-triazolyl-(3)]-ethyl-thiophosphonic acid ester | 2 hours |
| O-Ethyl-O-[1-ethyl-1,2,4-triazolyl-(3)]-ethyl-thiophosphonic acid ester | 5 hours |
| O-Ethyl-O-[1-cyclopentyl-1,2,4-triazolyl-(3)]-ethyl-thiophosphonic acid ester | 5 hours |
| O-Ethyl-O-[1-ethyl-5-methyl-1,2,4-triazolyl-(3)]-ethyl-thiophosphonate | 4 hours |
| O-(n)-propyl-O-[1-isopropyl-5-methyl-1,2,4-triazolyl-(3)]-methyl-thiophosphonate | 2 hours |
| O-Ethyl-O-[1-(2'-methylbutyl)-1,2,4-triazolyl-(3)]-ethyl-thiophosphonate | 4 hours |
| O-Ethyl-O-[1-(n)-butyl-1,2,4-triazolyl-(3)]-ethyl-thiophosphonate | 2 hours |
| O-(n)-Propyl-O-[1-phenyl-5-methyl-1,2,4-triazolyl-(3)]-methyl-thiophosphonate | 2 hours |
| O-(n)-Propyl-O-[1-isopropyl-1,2,4-triazolyl-(3)]-methyl-thiophosphonate | 2 hours |
| O,O-Dimethyl-S-(1,2-dicarbethoxy-ethyl)-dithiophosphate (known from the German Patent No. 847,897) | 48 hours (60%) | c. Systemic insecticidal action

In order to determine the systemic action, the soil of potted bean plants is watered per 600 cm$^3$ with 50 ml of an aqueous emulsion containing 100 ppm of active substance (the emulsion being obtained from a 10% emulsifiable concentrate).

Bean aphids (*Aphis fabae*) are placed after 3 days on to the parts of the plants above the soil. The insects are protected, by a special device, from the effect of contact and gas. The test is carried out at 24° with 70% relative humidity.

In the following table 5, the time in days is given after which 100% of the insects were in dorsal position.

Table 5

| Active substance | 100% of the insects in dorsal position after X days Bean aphids |
|---|---|
| O-Ethyl-O-[1-phenyl-1,2,4-triazolyl-(3)]-ethyl-thiophosphonic acid ester | 1 day |
| O-Methyl-O-[1-phenyl-1,2,4-triazolyl-(3)]-ethyl-thiophosphonic acid ester | 1 day |
| O-Ethyl-O-[1-isopropyl-1,2,4-triazolyl-(3)]-ethyl-thiophosphonic acid ester | 1 day |
| O-Ethyl-O-[1-cyclohexyl-1,2,4-triazolyl-(3)]-ethyl-thiophosphonic acid ester | 2 days |
| O-Ethyl-O-[1-ethyl-1,2,4-triazolyl-(3)]-ethyl-thiophosphonic acid ester | 1 day |
| O-Ethyl-O-[1-cyclopentyl-1,2,4-triazolyl-(3)]-ethyl-thiophosphonic acid ester | 1 day |
| O,O-Diethyl-O-[1-phenyl-1,2,4-triazolyl-(3)]-thiophosphate (known from the German Patent No. 1,299,924) | 3 days (50 %) |

The nematicidal effectiveness of the new compounds of formula I compared with known compounds is illustrated by means of the following test:

To test the action against soil nematodes, the active substance is added, in the concentration stated in each case, to the soil infected with root-gall-nematodes (*Meloidogyne arenaria*), and the whole intimately mixed. In the test series A (Table 6), tomato seedlings are planted immediately afterwards in the thus prepared soil; and, in the test series B (Table 7), tomatoes are sown after 8 days' waiting time.

For the assessment of the nematicidal action, the galls present on the roots are counted 28 days after planting or after sowing.

Evaluation

0 = full nematicidal action = no infestation,
5 = no nematicidal action = same infestation as in the case of the control specimen,
1–4 = intermediate stages of infestation.

EXAMPLE 4

Acaricidal action - Action against red spider mites

Beam plants (*Phaseolus vulgaris*) in the two-leaf stage are infested, 12 hours before the treatment with the active substance, with red spider mites by the placing on of infested pieces of leaves, from a culture, so that after this period of time there is present a population in all stages of development on the plant. With the aid of a chromatography-sprayer, the plants are then sprayed with the emulsified active substance until an even coating of droplets is obtained on the surface of the leaves. The results of the test are assessed after 7 days: The parts of the plants are examined under a stereo-microscope in order to estimate the destruction percentages.

In the following table are listed the percentage figures for the degree of destruction of the normal-sensitive species *Tetranychus urticae* Koch Table 6

Test series A
Concentration: 50 ppm

| Active substance | Nematicidal action |
|---|---|
| O-Ethyl-O-[1-phenyl-5-methyl-1,2,4-triazolyl-(3)]-ethyl-thiophosphonic acid ester | 0 |
| O-Ethyl-O-[1-isopropyl-1,2,4-triazolyl-(3)]-ethyl-thiophosphonic acid ester | 0 |
| O-Ethyl-[1-isopropyl-5-methyl-1,2,4-triazolyl-(3)]-ethyl-thiophosphonate | 0 |
| O-Ethyl-O-[1-cyclopentyl-1,2,4-triazolyl-(3)]-ethyl-thiophosphonate | 0 |
| O-Ethyl-O-[1-n-propyl-1,2,4-triazolyl-(3)]-ethyl-thiophosphonate | 0 |
| O-Ethyl-O-[1-sec.butyl-1,2,4-triazolyl-(3)]-ethyl-thiophosphonate | 1 |
| O-Ethyl-O-[1-ethyl-5-methyl-1,2,4-triazolyl-(3)]-ethyl-thiophosphonate | 0 |
| Tetrahydro-3,5-dimethyl-2H-1,3,5-thiadiazine-2-thione (known from Chem. Week No. 12.4.69, p. 56) | 5 |

Table 7

Test series B
Concentration: 50 ppm

| Active substance | Nepaticidal action |
|---|---|
| O-Ethyl-O-[1-phenyl-5-methyl-1,2,4-triazolyl-(3)]-ethyl-thiophosphonic acid ester | 0 |
| O-Ethyl-O-[1-isopropyl-1,2,4-triazolyl-(3)]-ethyl-thiophosphonic acid ester | 0 |
| O-Ethyl-[1-isopropyl-5-methyl-1,2,4-triazolyl-(3)]-ethyl-thiophosphonate | 0 |
| O-Ethyl-O-[1-cyclopentyl-1,2,4-triazolyl-(3)]-ethyl-thiophosphonate | 0 |
| O-Ethyl-O-[1-n-propyl-1,2,4-triazolyl-(3)]-ethyl-thiophosphonate | 0,3 |
| O-Ethyl-O-[1-sec.butyl-1,2,4-triazolyl-(3)]-ethyl-thiophosphonate | 1 |
| O-Ethyl-O-[1-ethyl-5-methyl-1,2,4-triazolyl-(3)]-ethyl-thiophosphonate | 0 |
| Tetrahydro-3,5-dimethyl-2H-1,3,5-thiadiazine-2-thione (known from Chem. Week No. 12.4.69, p. 56) | 2 |

Table 8

| Active substance | 100% destruction after 6 days with a concentration of x ppm | | |
|---|---|---|---|
| | Eggs | Larvae | Adults |
| O-Ethyl-O-[1-phenyl-5-methyl-1,2,4-triazolyl-(3)]-ethyl-thiophosphonate | 100 | 100 | 100 |
| O-Ethyl-O-[1-phenyl-1,2,4-triazolyl-(3)]-ethyl-thiophosphonate | 50 | 50 | 10 |
| O-Methyl-O-[1-phenyl-1,2,4-triazolyl-(3)]-ethyl-thiophosphonate | 50 | 10 | 10 |
| O-Ethyl-O-[1-isopropyl-1,2,4-triazolyl-(3)]-ethyl-thiophosphonate | 100 | 50 | 50 |

EXAMPLE 5

Fungicidal action - Action against *Erysiphe cichoracearum* on *Cucumis sativus*

Young *Cucumis sativus* plants were sprayed, after being sprayed with a 0.1% suspension of the active substance prepared as a wettable powder, and after drying of the sprayed-on coating, with a spore suspension of the fungus. After 8 days in a greenhouse at about 23° C, the degree of infestation (proportion of leaf-surface covered by mycelia) on the infected and treated leaves was determined and compared with that existing on the untreated, infected control specimens.

Table 9

| Active substance | Infestation |
|---|---|
| O-Methyl-O-[1-phenyl-5-methyl-1,2,4-triazolyl-(3)]-ethyl-thiophosphonate | 0 – 20% |
| O-Ethyl-O-[1-ethyl-1,2,4-triazolyl-(3)]-phenyl-thiophosphonate | 0 – 20% |
| O-Ethyl-O-[1-n-hexyl-1,2,4-triazolyl-(3)]-ethyl-thiophosphonate | 0 – 20% |
| O-Ethyl-O-[1-phenyl-5-methyl-1,2,4-triazolyl-(3)]-ethyl-thiophosphonate | 5 – 25% |
| Untreated control specimen | 100% |

We claim:

1. A compound of the formula:

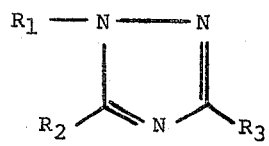

(I)

wherein
R₁ represents a lower alkyl radical, cyclopentyl, cyclohexyl, or a $(X)_n$—$C_6H_{5-n}$ radical wherein X is chlorine or bromine and n is a number from 0 to 2, of the symbols
R₂ and R₃ any one represents hydrogen, a lower alkyl radical, cyclopentyl, cyclohexyl, a phenyl radical, or chlorophenyl, and the other then represents the radical:

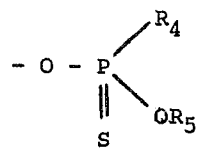

wherein R₄ represents a lower alkyl radical or the phenyl radical, and R₅ represents a lower alkyl radical.

2. A compound according to claim 1 wherein R₁ represents $C_1$–$C_6$-alkyl, phenyl, 3-chlorophenyl, 4-chlorophenyl, 4-bromophenyl or 2,5-dichlorophenyl; R₂ represents hydrogen, phenyl, $C_1$–$C_4$-alkyl, or

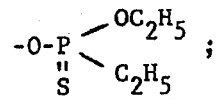

R₃ represents phenyl or

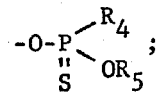

R₄ represents methyl, ethyl or phenyl; and R₅ represents $C_1$–$C_5$-alkyl.

3. Compound according to claim 1 of the formula:

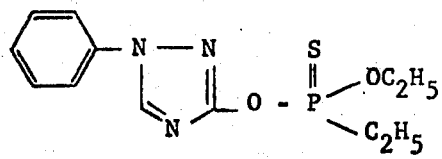

4. Compound according to claim 1 of the formula:

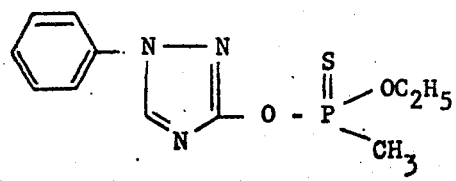

5. Compound according to claim 1 of the formula:

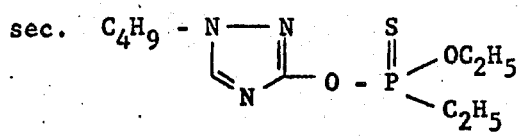

6. Compound according to claim 1 of the formula:

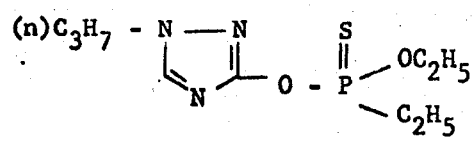

7. Compound according to claim 1 of the formula:

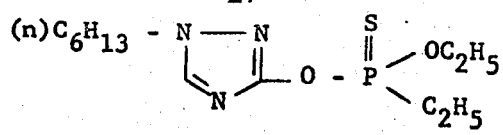

8. Compound according to claim 1 of the formula:

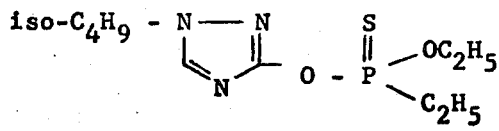

9. Compound according to claim 1 of the formula:

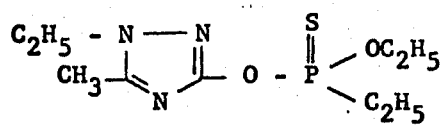

10. Compound according to claim 1 of the formula:

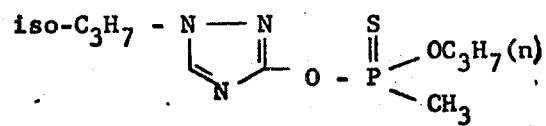

11. Compound according to claim 1 of the formula:

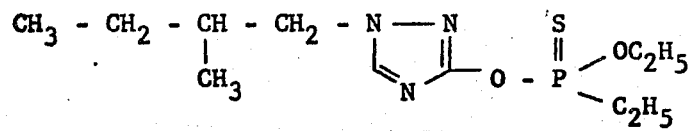

12. Compound according to claim 1 of the formula:

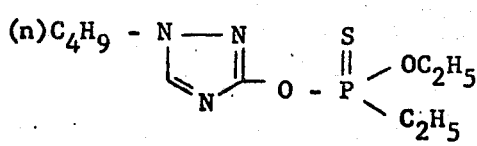

13. Compound according to claim 1 of the formula:

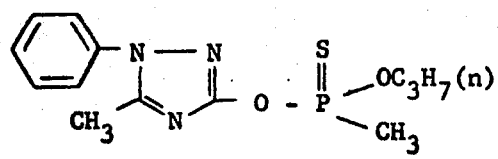

14. Compound according to claim 1 of the formula:

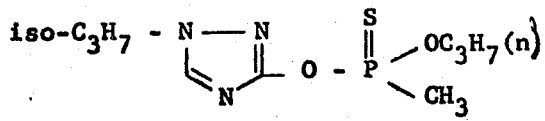

15. A compound of the formula

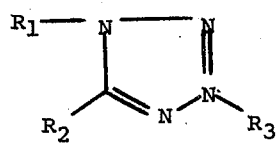

wherein $R_1$ represents $C_1$–$C_6$ alkyl, phenyl, 3-chlorophenyl, 4-chlorophenyl, 4-bromophenyl or 2,5-dichlorophenyl, $R_2$ represents hydrogen, $C_1$–$C_4$ alkyl, cyclopentyl, cyclohexyl, phenyl and $R_3$ represents the radical

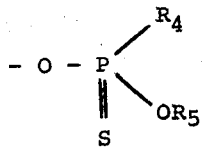

wherein $R_4$ represents methyl, ethyl or phenyl; and $R_5$ represents $C_1$–$C_5$ alkyl.

* * * * *